Figure 1:
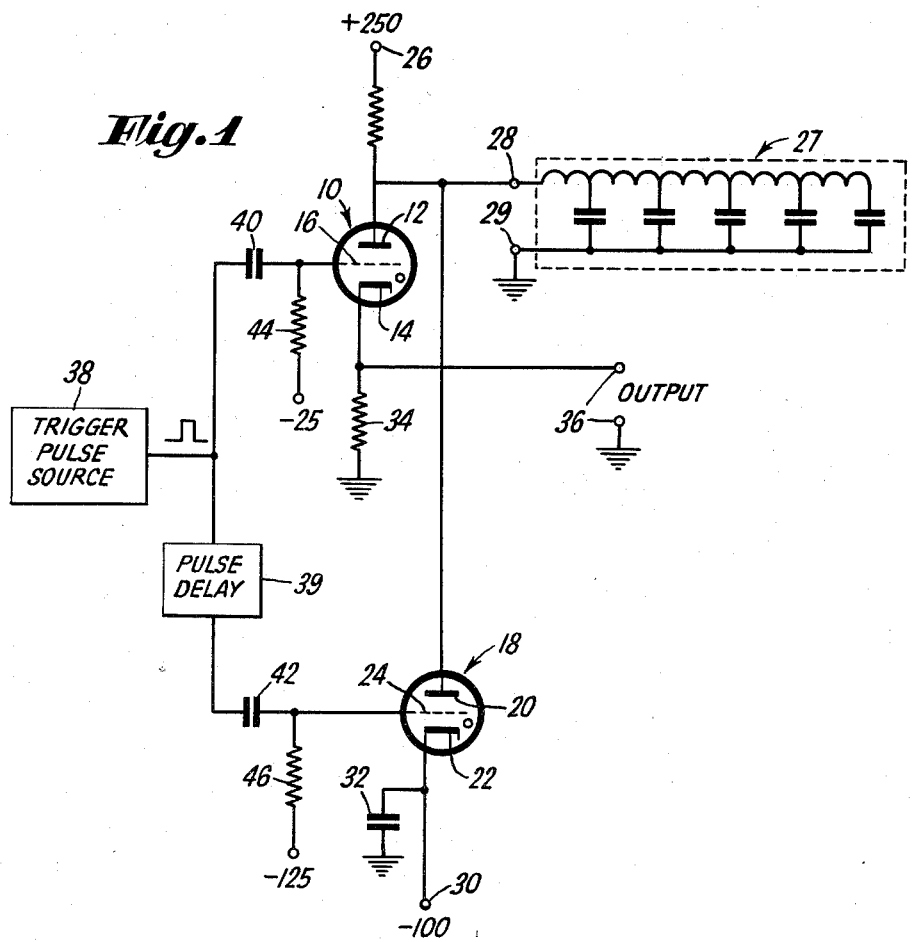

June 21, 1960

M. FISCHMAN 2,942,190

PULSE GENERATOR

Filed March 26, 1958

INVENTOR
MARTIN FISCHMAN
BY Theodore Jay Jr.
ATTORNEY

United States Patent Office 2,942,190
Patented June 21, 1960

2,942,190

PULSE GENERATOR

Martin Fischman, Wantagh, N.Y., assignor, by mesne assignments, to Sylvania Electric Products Inc., Wilmington, Del., a corporation of Delaware Filed Mar. 26, 1958, Ser. No. 724,108

1 Claim. (Cl. 328—61)

This invention relates to the generation of electrical impulses having a predetermined waveform.

There are various applications where it is desired to utilize an electrical impulse having a trailing edge with a very high rate of decay. One specific example is in the field of semiconductors.

In studying semiconductors, it is desirable to observe their behavior on an oscilloscope during extremely short intervals of time following a change of electric state therein, e.g., from conduction to non-conduction. Some of these phenomena are extremely short in duration, for example, of the order of a small fraction of a microsecond.

The electric state is switched from conduction to non-conduction by means of an on-off signal, such as a pulse. The rapidity of switching is determined by the rate of rise and rate of decay of the leading and trailing edges, respectively, of the pulse. In order to accurately observe the aforementioned phenomena, it is necessary that the time duration of the leading and trailing edges be considerably smaller than the duration of the phenomena itself; if this condition is not met, the phenomena cannot be effectively studied.

The equipment heretofore employed to produce the pulses is incapable of generating a pulse having a trailing edge with an extremely short duration, or stated another way, a trailing edge with a very high rate of decay.

I have discovered means for producing a pulse wherein the trailing edge thereof has a very high rate of decay.

It is therefore an object of this invention to generate a pulse having a trailing edge with a higher rate of decay than heretofore known.

It is another object of the invention to provide new and improved apparatus for producing a pulse having a very high rate of decay.

These and other objects of my invention will either be explained or will become apparent hereinafter.

In accordance with the principles of my invention, I provide first and second electrical devices, each having first, second and third electrodes and being characterized by first and second mutually exclusive electric states.

My circuit further includes an input circuit coupled between the first and second electrodes of each device. Both devices are normally in the first electric state, the first device being triggered into the second state upon the arrival of a control signal at its input circuit, and the second device being also triggered into the second state upon the arrival of a control signal at its input circuit.

The third electrodes of the first and second devices are interconnected whereby the second device when triggered into the second state changes the first device into the first state.

The circuit further includes electric energy storage means coupled between the first and third electrodes of the first device, which means changes the second device from the second state back to the first state before the arrival of another control signal at the input circuit of the first device.

An impedance is coupled in the input-output path of the first device across which a pulse is developed. At some given time a control signal is fed to the input circuit of the first device, triggering that device from its first state into its second state and thereby producing a voltage rise across the impedance, this rise forming the leading edge of the pulse. The voltage across the impedance then maintains a substantially steady value until a later time when a control signal is fed to the input circuit of the second device. This triggers the second device from its first state to its second state causing the first device to revert from its second state to its first state, thereby forming the trailing edge of the pulse as the voltage across the impedance drops to zero.

Figure 2:
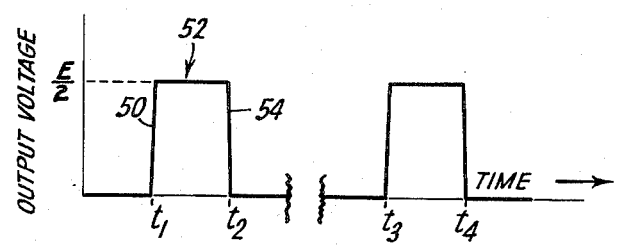

Illustrative embodiments of my invention will now be described in detail with respect to the accompanying drawings wherein:

Fig. 1 is a schematic diagram of a circuit embodying the principles of my invention; and Fig. 2 is a diagram of the waveforms produced by my invention.

Referring now to Fig. 1, I provide a first electrical discharge device 10 having an anode or output electrode 12, a cathode or input electrode 14 and a grid or control electrode 16. A second electrical discharge device 18 having an anode 20, a cathode 22, and a control grid 24 is also provided. These electrical discharge devices can be, for example, thyratrons of the type commerically designated as 6D4 or 884. The anodes 12 and 20 of these thyratrons are interconnected and are coupled to a first point of potential 26 which can be, for example, +250 volts with respect to ground.

There is also provided a delay line 27 having terminals 28 and 29 and consisting of a network of inductance-capacitance sections connected to form an artificial transmission line open circuited at the far end. The delay line is connected to the anodes at its terminal 28 and to ground potential at its terminal 29.

The cathode 22 of the second thyratron is coupled to a second point of potential 30 which is more negative than ground potential, for example, −100 volts. A capacitor 32 is connected between the cathode and ground, the latter being a third point of potential intermediate the potenials on the first and second points.

A resistor 34 is coupled between the cathode 14 of the first thyratron and ground potential, for developing output pulses thereacross; these pulses are presented to the output terminals 36 for utilization by any equipment connected thereto. The cathode load 34 need not be a resistor; it can be any other suitable impedance device, for example, the primary of a coupling transformer.

There is also provided a pulse source 38 for supplying triggering pulses through capacitors 40 and 42 respectively to the control grids 16 and 24. Associated with the pulse source 38 is a pulse delay network 39 for delaying the pulse to the grid 24 so that the second thyratron 18 fires at some desired time later than the first thyratron 10. The network 39 may include a continuously variable time delay feature, thus making it possible to generate pulses of different width. Any other suitable pulse delay means may be used for supplying pulses to the grid 24, including means entirely independent of that used to supply pulses to the grid 16. Grid resistors 44 and 46 are also connected respectively to the grids 16 and 24 for impressing the proper negative potential on the grids with respect to their cathodes to maintain the thyratrons in their normally non-conductive or first state. The resistor associated with each grid is returned to a source of potential which is approximately 25 volts more negative than the cathode with which it is associated.

The circuit operates in the following manner. Both thyratrons 12 and 18 are initially in the non-conductive or first state; therefore, the voltage across the resistor 34 and across the output terminals 36 is zero. The delay line 27 is charged to a voltage E which is determined by the voltage between the point 26 and ground, which in this case is 250 volts. The impedance of the resistor 34 is made equal to the characteristic impedance of the delay line 27. At a time $t_1$, Fig. 2, a positive pulse from the pulse source 38 is impressed on the grid 16 of the first thyratron 10, triggering that thyratron. Since the first thyratron is now conductive or in the second state, the delay line 27 discharges through the circuit comprising the first thyratron and the resistor 34, causing the voltage across the resistor 34 to rise rapidly from zero to a positive value; this voltage rise forms the leading edge 50 of the pulse 52 shown in Fig. 2. Since the impedance of the resistor equals the characteristic impedance of the delay line, the potential across the resistor 34 will rise to approximately $E/2$ or approximately 125 volts, but it cannot be exactly that value because of the drop across the thyratron. This value is maintained from time $t_1$ until the second thyratron 18 is fired. Also, when the first thyratron 10 is fired, the potential across the terminals 28—29 of the delay line drops from +250 volts to approximately $E/2$ or approximately +125 volts; this value is likewise maintained until the second thyratron is fired.

At a time $t_2$, the triggering pulse from the source 38 arrives at the grid 24 of the second thyratron 18 after being delayed by the network 39. This fires the second thyratron and two effects are thereby produced. First, the potential on the anodes of both thyratrons will approximate the −100 volts on the cathode 22 of the second thyratron. Since this value is more negative than the potential on the cathode 14 of the first thyratron, this thyratron will become non-conductive, i.e., it will now be in the first state. This results in a drop of the current through the resistor 34 from its maximum value to zero, thus forming the trailing edge 54 of the pulse. The cessation of current through the thyratron is extremely rapid and consequently the rate of decay of the trailing edge is extremely high.

Secondly, the firing of the second thyratron 18 changes the potential across the terminals 28—29 of the delay line from a value of approximately +125 volts to a value of approximately −100 volts, a change of approximately 225 volts. A wave front having this value surges down the line, is reflected at the far end and travels back to the terminal end. The value of this reflected wave is approximately 225 volts and this is large enough to drive the anode 20 of the second thyratron 18 more negative than its cathode 22, thus making the second thyratron non-conductive. Both thyratrons are now again in their non-conductive or first states and the action may be repeated to produce a continuous pulse train.

It should be noted that at time $t_1$ a wave front also surged down the delay line 27 by reason of a potential change at its terminals 28—29 when the first thyratron 10 became conductive. This wave front was reflected at the far end of the line and returned to the terminal end, but since the impedance of the resistor 34 is equal to the characteristic impedance of the delay line, the value of the reflected wave is insufficient to drive the anode 18 more negative than the cathode 22 of the first thyratron to make it non-conductive. If desired, however, the second thyratron can be rendered non-conductive at this point, i.e. upon the return of the wave front initiated at time $t_1$, by making the impedance of the resistor 34 somewhat less than the characteristic impedance of the delay line. This will produce a larger wave front potential across the terminals of the delay line upon the firing of the first thyratron, which when reflected will be large enough to drive the anode of the second thyratron more negative than the cathode thereof, thus rendering it non-conductive. For any resistor value equal to or greater than the characteristic impedance of the line, however, the reflected wave front initiated by the firing of the first thyratron will be too small to render the second thyratron non-conductive and this state must then be achieved by the reflected wave front initiated by the firing of the second thyratron itself at time $t_2$.

The trailing edges of the pulses generated by my apparatus not only have an extremely high rate of decay, but their shape and duration are independent of the characteristics of the delay line. Further the pulse developed in accordance with the principles of my invention automatically has a uniform base line independent of the characteristics of the second thyratron, because the leading and trailing edges of the pulse are necessarily made to respectively commence and terminate at zero potential.

While I have shown and pointed out my invention as applied above, it will be apparent to those skilled in the art that many modifications can be made within the scope and sphere of my invention.

What is claimed is:

Apparatus of the character described comprising a first thyratron tube and a second thyratron tube, each tube having an anode, a cathode and a grid; a trigger pulse source; first passive coupling means connecting said source to the grid of the first tube; a passive pulse delay network and second passive coupling means connecting said source to the grid of the second tube so that pulses from said source reach the grid of the second tube a predetermined time later than they reach the grid of the first tube; means connecting the anodes of said tubes together; an open ended delay line having inductance and capacity; means connecting one input terminal of said line to said anodes and the other input terminal of said line to ground; a resistor having a resistance substantially equal to the surge impedance of said line connected between the cathode of said first tube and ground; output terminals connected to said resistor; means for subjecting the cathode of the second tube to a negative potential with respect to ground, and means for subjecting the grid of the second tube to a negative potential with respect to ground.

References Cited in the file of this patent

UNITED STATES PATENTS

| | | |
|---|---|---|
| 2,568,265 | Alvarez | Sept. 18, 1951 |
| 2,575,559 | Parkinson | Nov. 20, 1951 |
| 2,707,751 | Hance | May 3, 1955 |
| 2,767,311 | Meyer | Oct. 16, 1956 |